United States Patent
Krepps

(10) Patent No.: US 7,849,968 B1
(45) Date of Patent: Dec. 14, 2010

(54) OIL FILTER DRAINING FUNNEL AND ASSOCIATED METHOD

(76) Inventor: David Krepps, 201 Krepps La., Pottstown, PA (US) 19465

( * ) Notice: Subject to any disclaimer, the term of this patent is extended or adjusted under 35 U.S.C. 154(b) by 585 days.

(21) Appl. No.: 11/906,697

(22) Filed: Oct. 3, 2007

Related U.S. Application Data

(60) Provisional application No. 60/849,185, filed on Oct. 4, 2006.

(51) Int. Cl.
*F16N 33/00* (2006.01)
(52) U.S. Cl. .......................................... 184/1.5; 222/82
(58) Field of Classification Search ................... 184/1.5; 222/82
See application file for complete search history.

(56) References Cited

U.S. PATENT DOCUMENTS

| | | | | |
|---|---|---|---|---|
| 2,038,775 A | * | 4/1936 | Weber | 222/86 |
| 2,722,210 A | * | 11/1955 | Koonce | 123/196 R |
| 3,227,310 A | * | 1/1966 | Farandatos | 222/5 |
| 4,267,945 A | * | 5/1981 | Maynard, Jr. | 222/83.5 |
| 4,676,281 A | * | 6/1987 | Nord | 141/1 |
| 4,865,156 A | * | 9/1989 | Poling | 184/1.5 |
| 5,390,823 A | | 2/1995 | Kilgore | |
| 5,598,951 A | | 2/1997 | DeBano, Jr. | |
| 5,722,508 A | * | 3/1998 | Kraus | 184/1.5 |
| 5,975,156 A | * | 11/1999 | Senour | 141/98 |
| 6,056,874 A | | 5/2000 | Goodman | |

* cited by examiner

*Primary Examiner*—Thomas J. Brahan

(57) ABSTRACT

An oil filter draining apparatus includes a bifurcated funnel with a first region defining an open top end and a second region defining a tapered spout. The apparatus further includes a plurality of channels formed within the support wall and extending downwardly to the spout and a rigid puncturing implement removably attached to the funnel and centrally aligned within the top end. Such a puncturing implement is anchored to the support wall and extends vertically up from the support wall and terminates at an axially opposed position from the spout. The puncturing implement is penetrable into one end of the existing filters and thereby causes oil to drain out therefrom while the existing filter is attached to the existing engine such that residual oil trapped within the existing filter is substantially drained before the existing filter is removed from the engine.

11 Claims, 5 Drawing Sheets

OIL FILTER DRAINING FUNNEL AND ASSOCIATED METHOD

CROSS REFERENCE TO RELATED APPLICATIONS

This application claims the benefit of U.S. Provisional Application No. 60/849,185, filed Oct. 4, 2006, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to oil filters and, more particularly, to an oil filter draining funnel for discharging oil contained within an existing filter before the existing filter is removed from an existing engine.

2. Prior Art

It is not always easy to determine when, or if, major repair—or perhaps a complete overhaul—is required for an automobile or truck engine. High mileage is not necessarily an indication that engine work is needed, just as low mileage does not preclude the need for maintenance action. Frequency of servicing is the single most important consideration to prolong the life of an engine. An engine that has regular and frequent oil and filter changes, as well as other required maintenance, will most likely give thousands of miles of reliable service. Conversely, a neglected engine may require an overhaul very early in its life.

Most motorists realize the need to change the oil in a vehicle on a regular basis and either do it themselves or have the work performed by a service station or automotive service facility. The first step in this procedure is to remove the oil plug from the oil pan and allow all of the oil to drain into a container, the oil being safely disposed of later. The next step, the removal of the oil filter, is usually done with a strap wrench, a tool especially designed for this purpose. Some model cars are equipped with an oil filter that is enclosed within a metal housing which must be removed with standard wrenches. A problem encountered when removing the oil filter, whether using a strap wrench or a standard wrench, is that a fair amount of oil (about a quart) is still contained within the filter and most of this oil will leak out and onto the surrounding area before the filter is completely removed.

This, in addition to creating an unsightly mess, is ecologically damaging if the vehicle is parked on a natural surface—not concrete—and seeps into the ground. Having recognized the need for a device that would eliminate this problem, the present invention was developed. Based on the above mentioned needs, it would be advantageous to provide a means for draining and collecting used oil contained within the oil filter prior to removing the oil filter from the automotive vehicle.

U.S. Pat. No. 5,390,823 to Kilgore discloses a hand tool for draining vehicular oil filters. The tool separates into two assemblies: a Valve and Handle segment; and a Punch and Drain Tube segment. A User may obtain Punch and Drain Tubes of different lengths. The purpose of this segmentation is to allow a User to attach the Punch and Drain Tube with the most suitable length for each filter access problem. The Punch is placed against the lowest point of an installed oil filter. Using simple arm strength or a rubber mallet, the tool is driven through the sheetmetal housing and interior partition of the oil filter. Once the tool has penetrated the two sheetmetal surfaces, friction between the tool and the two sheetmetal surfaces holds the tool suspended from the oil filter. With the filter punctured, oil drains through the cavity of the tool to the low end where it is checked by a valve. A suitable container is situated beneath the handle end of the tool, and the valve is opened to allow oil from the oil filter to drain through the tool and into the container. By adjusting the depth of penetration, both chambers of an oil filter can be drained. After the oil has been drained, the tool is extracted. Unfortunately, this prior art example is not designed for draining a filter into an appropriate container.

U.S. Pat. No. 5,598,951 to DeBano, Jr. discloses a device for draining an engine's oil filter before removal of the filter from the engine, in order to minimize oil spillage from the filter during its removal from the engine. This device includes a hollow shaft having a closed end and an open end, a piercing point attached to the shaft at the open end, a flexible polymeric boot attached to the shaft adjacent to and enshrouding the piercing point, and a polymeric covering enveloping the shaft between the closed end and the portion where the flexible polymeric boot is attached. Unfortunately, this prior art example is not designed for draining a filter into an appropriate container.

U.S. Pat. No. 6,056,874 to Goodman discloses spillable oil from an oil filter and adjacent engine cavities of trapped engine oil being transferred outwardly through filter housing sidewalls at designated low points to a temporary boot container by gravity following a piercing operation through the filter housing. Oil transfer to the container is performed prior to breaking the seal between the engine block and the filter. All of the spillable oil is caught in the boot containment device which incorporates internal tack like hollow piercing elements. The required piercing force to drive the tacks into the filter wall may be applied to the exterior of the filter boot using common filter strap wrenches, or by light taps from a hammer, wrench or similar tool. Unfortunately, this prior art example is not designed for draining a filter into an appropriate container.

Accordingly, the present invention is disclosed in order to overcome the above noted shortcomings. The present invention satisfies such a need by providing an apparatus that is convenient and easy to use, lightweight yet durable in design, and designed for discharging oil contained within an existing filter before the existing filter is removed from an existing engine. The present invention is simple to use, inexpensive, and designed for many years of repeated use.

BRIEF SUMMARY OF THE INVENTION

In view of the foregoing background, it is therefore an object of the present invention to provide an apparatus for discharging oil contained within an existing filter before the existing filter is removed from an existing engine. These and other objects, features, and advantages of the invention are provided by an oil filter draining apparatus.

An oil filter draining apparatus includes a bifurcated funnel with a first region defining an open top end and further has a second region defining a tapered spout terminating at a bottom most edge of the funnel respectively. Such a funnel has a support wall formed substantially medially of the funnel and at a top entrance of the spout such that the top end and the spout are effectively in fluid communication, and the top end converges downwardly towards the spout. Such a support wall includes a plurality of coextensively shaped ribs flanging radially away from a center thereof. Such ribs are monolithically formed with an interior surface of the funnel and disposed above the spout.

The apparatus further includes a plurality of channels conveniently formed within the support wall and extending downwardly to the spout. Such a plurality of channels is laterally spaced away from the second threaded outer section of the shaft. The plurality of channels are laterally spaced away from the second threaded outer section of the shaft The apparatus further includes a rigid puncturing implement removably attached to the funnel and centrally aligned within the top end. Such a puncturing implement is advantageously anchored to the support wall and extends vertically up from the support wall and terminates at an axially opposed position from the spout. The puncturing implement effectively includes an elongated and rectilinear shaft with a first threaded outer section extending downwardly from a proximal end of the shaft and terminating above the support wall. Such a shaft further has a second threaded outer section juxtaposed subjacent to the first threaded outer section and is removably inserted into the support wall.

The shaft is provided with a pair of rectilinear grooves traveling along a major longitudinal length of the first threaded outer section. Such grooves are diametrically offset along opposed sides of the first threaded outer section such that residual oil contained within the existing oil filter is conveniently guided downwardly along separate paths and into the spout. The shaft has a distal end disposed above a top most edge of the spout, and the grooves extend inwardly towards a center of the shaft and along the second threaded outer section.

The puncturing implement is advantageously penetrable into one end of the existing filters and thereby causes oil to drain out therefrom while the existing filter is attached to the existing engine such that residual oil trapped within the existing filter is substantially drained before the existing filter is removed from the engine.

A method for draining oil from an existing filter includes the steps of: providing a bifurcated funnel with a first region defining an open top end and further with a second region defining a tapered spout terminating at a bottom most edge of the funnel respectively; removably attaching a rigid puncturing implement to the funnel by centrally aligning the puncturing implement within the top end; anchoring the puncturing implement to the funnel and extending the puncturing implement vertically up from generally the spout and terminating the puncturing implement at an axially opposed position from the spout; while the existing filter is attached to the existing engine, penetrating the puncturing implement into one end of the existing filter and thereby causing oil to drain out therefrom such that residual oil trapped within the existing filter is substantially drained; and removing the existing filter from the engine.

The method further includes the steps of: providing an elongated and rectilinear shaft with a first threaded outer section extending downwardly from a proximal end of the shaft and terminating above the second region; removably inserting a second threaded outer section of the shaft that is juxtaposed subjacent to the first threaded outer section of the shaft into the support wall; and downwardly guiding residual oil from the existing oil filter along separate paths and into the spout.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
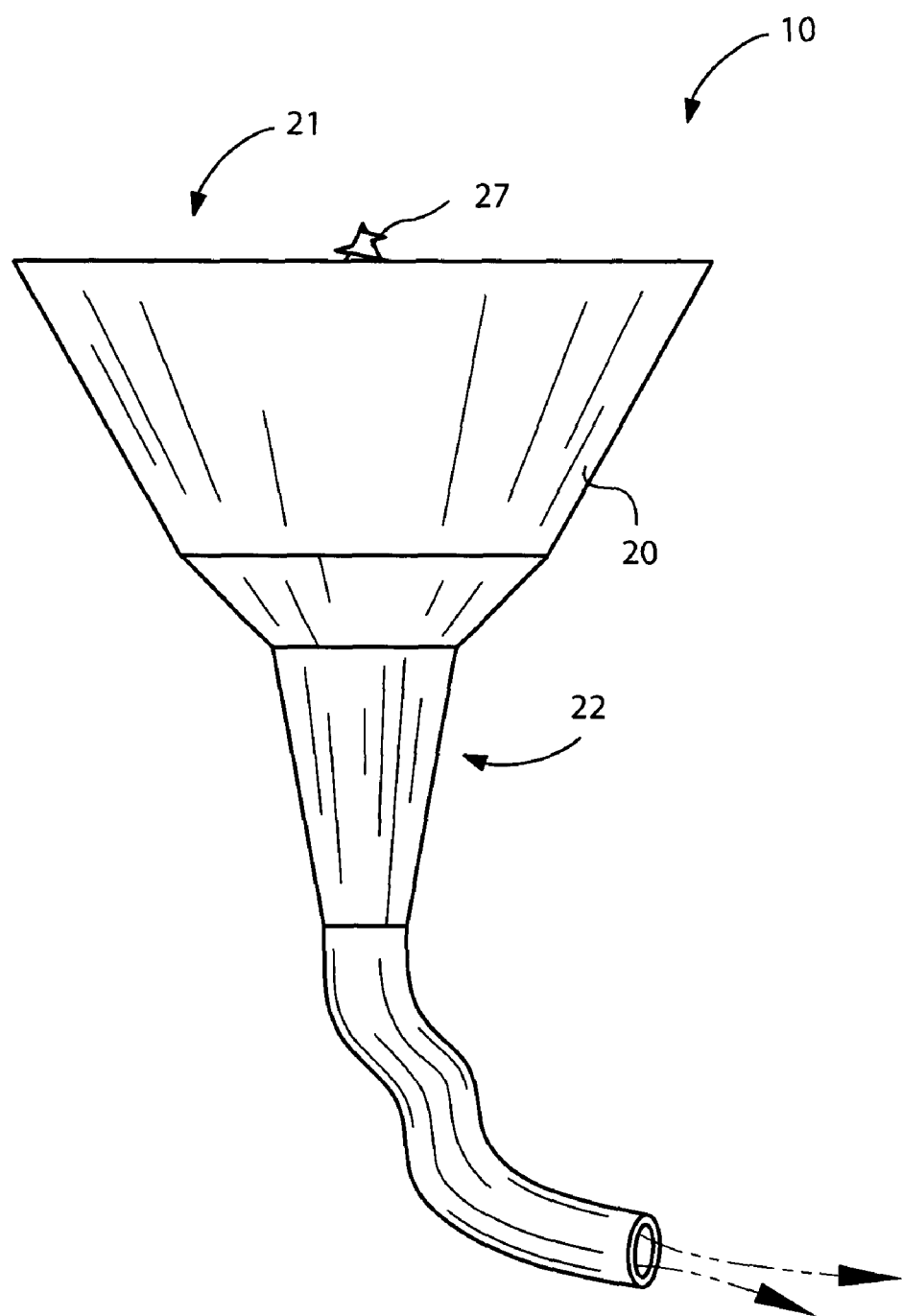
FIG. 1 is a front elevational view of an oil filter draining apparatus and an attached hose, respectively, in accordance with the present invention.
Figure 2:
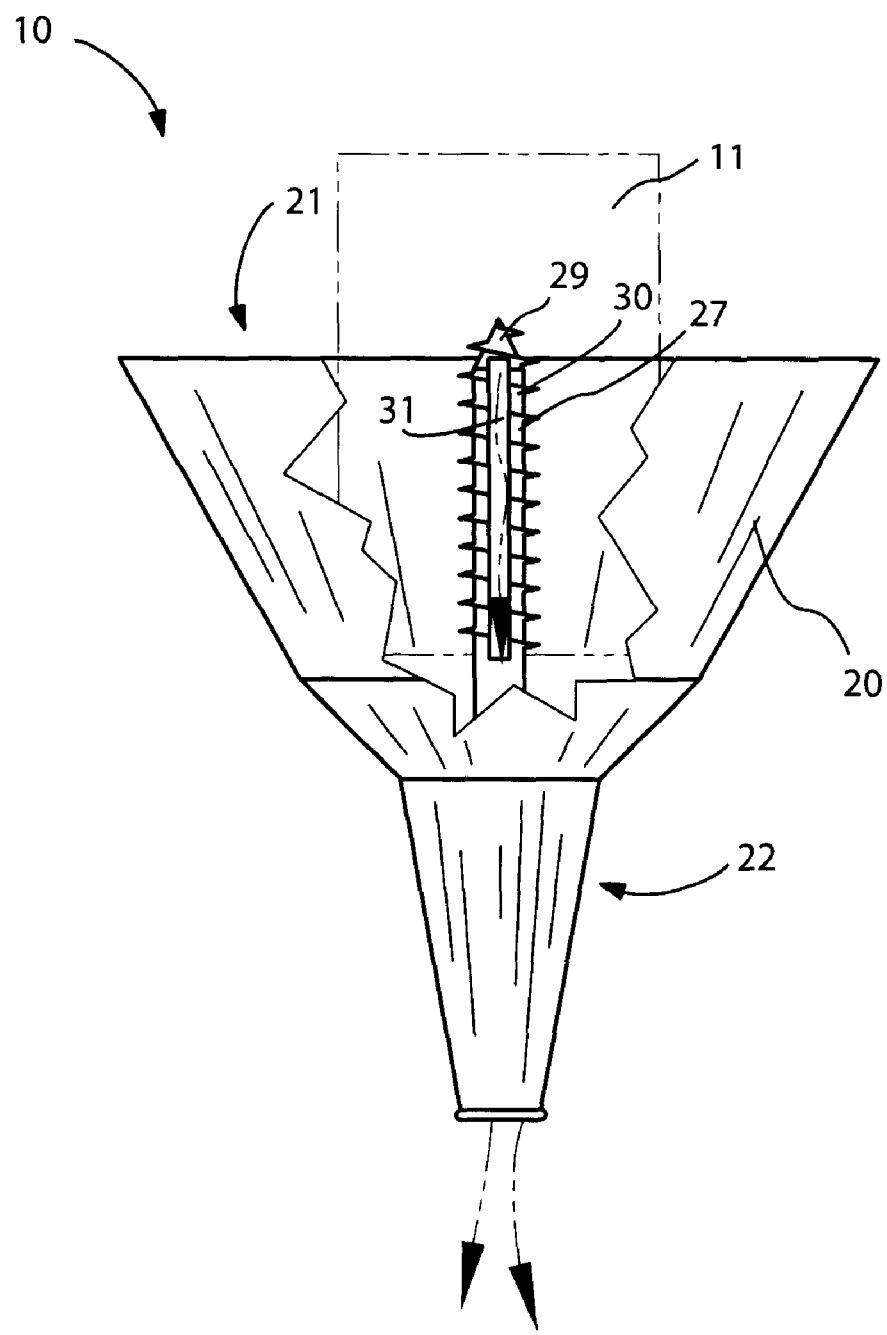
FIG. 2 is a segmented cross section of an oil filter draining apparatus, showing the rigid puncturing element, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-5 by the reference numeral 10 and is intended to protect an oil filter draining apparatus. It should be understood that the apparatus 10 may be used to drain many different types of filters and should not be limited in use with only those filters mentioned herein Referring initially to FIGS. 1, 2, 3, 4 and 5, an oil filter draining apparatus 10 includes a bifurcated funnel 20 with a first region defining an open top end 21 and further has a second region defining a tapered spout 22 terminating at a bottom most edge of the funnel 20 respectively. Such a funnel 20 has a support wall 23 formed substantially medially of the funnel 20 and at a top entrance of the spout 22 which is essential such that the top end 21 and the spout 22 are in fluid communication, and the top end 21 converges downwardly towards the spout 22. Such a support wall 23 includes a plurality of coextensively shaped ribs 24 flanging radially away from a center thereof. Such ribs 24 are monolithically formed with an interior surface of the funnel 20 and disposed above the spout 22. The open top end 21 is fitted over an existing oil filter 11, and once the oil filter 11 is punctured, the oil flows downward through the spout 22.

Figure 3:
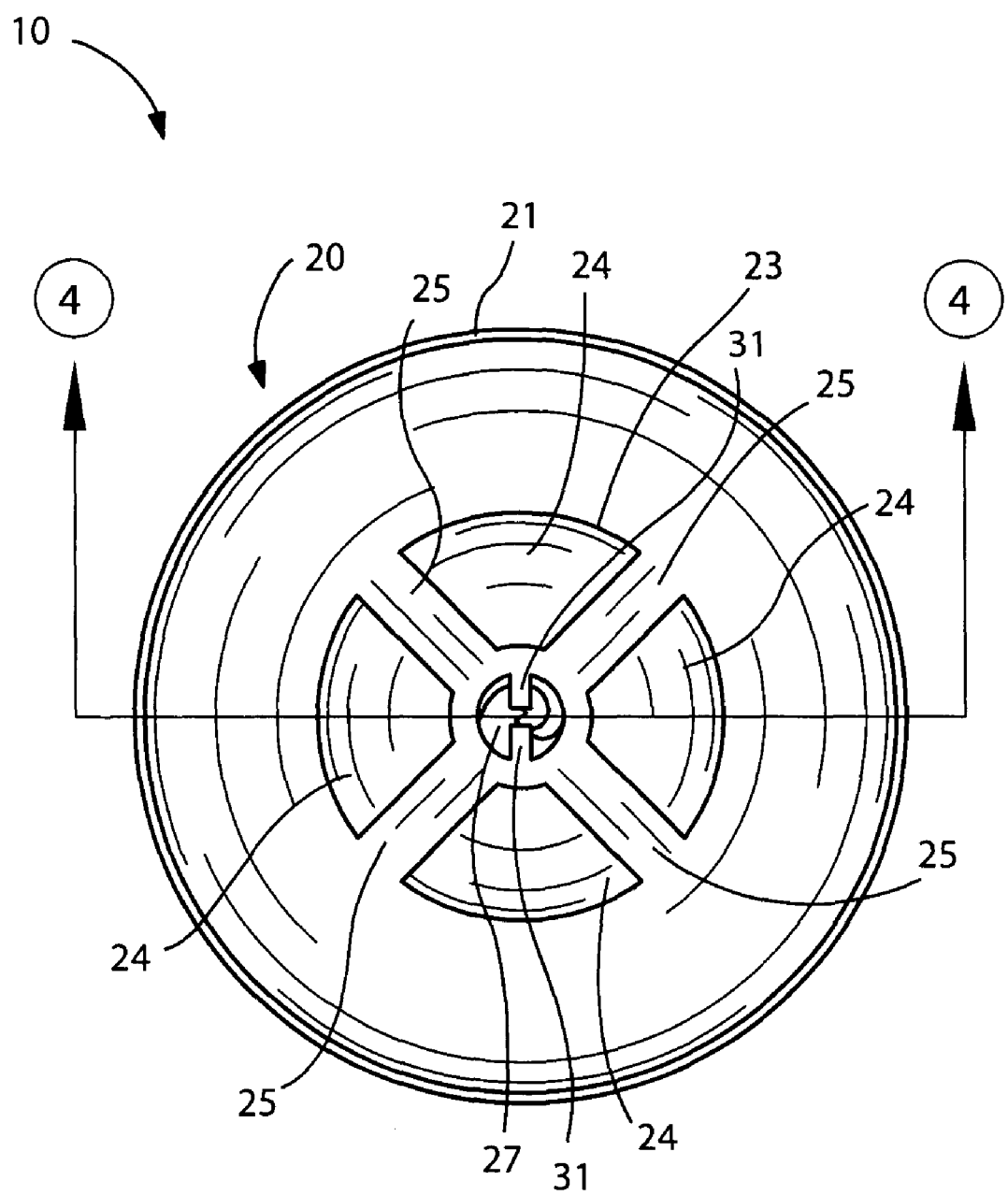
FIG. 3 is a top planar view of an oil filter draining apparatus, in accordance with the present invention.
Figure 4:
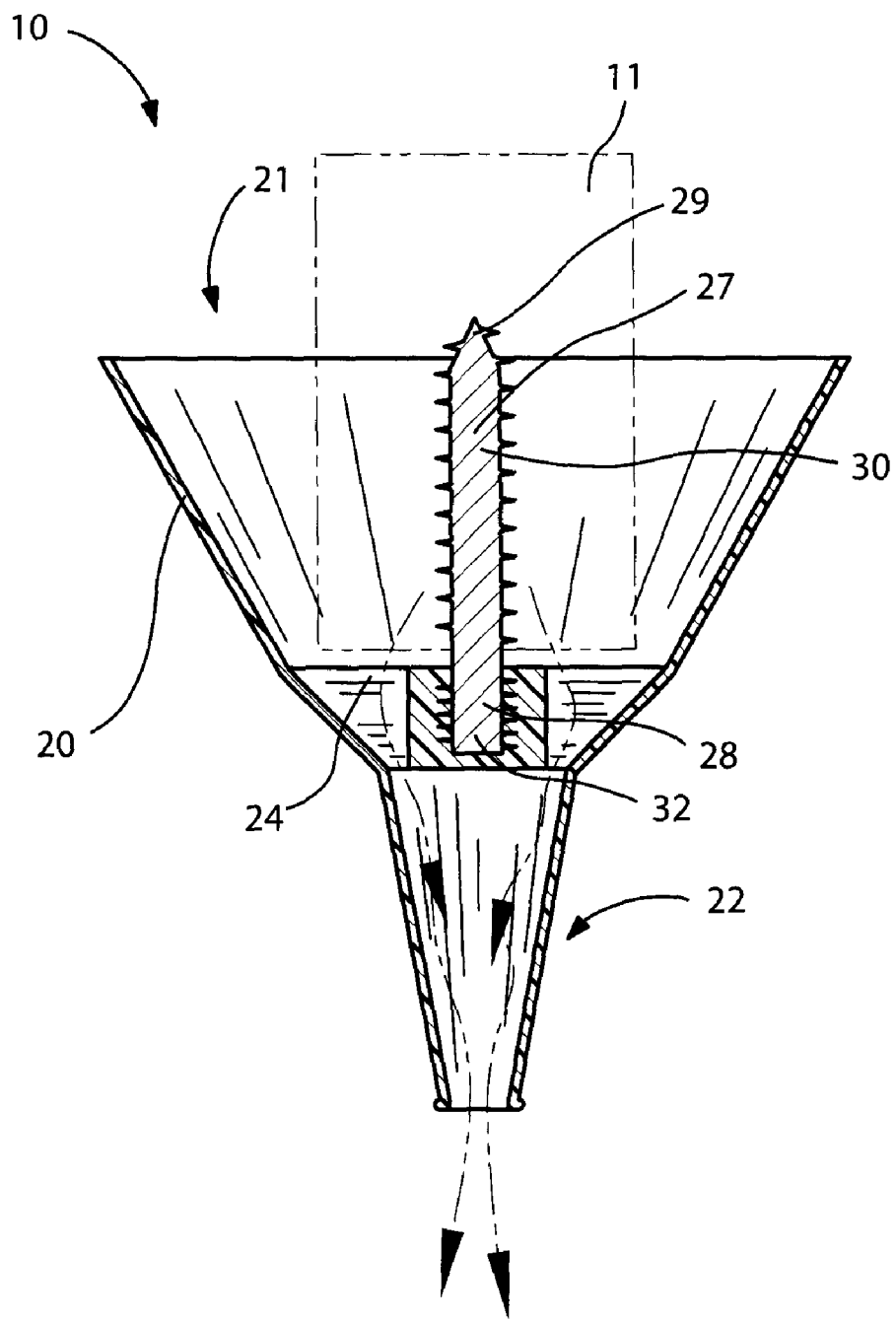
FIG. 4 is a cross sectional view, taken along line 4-4, as seen in FIG. 3.
Figure 5:
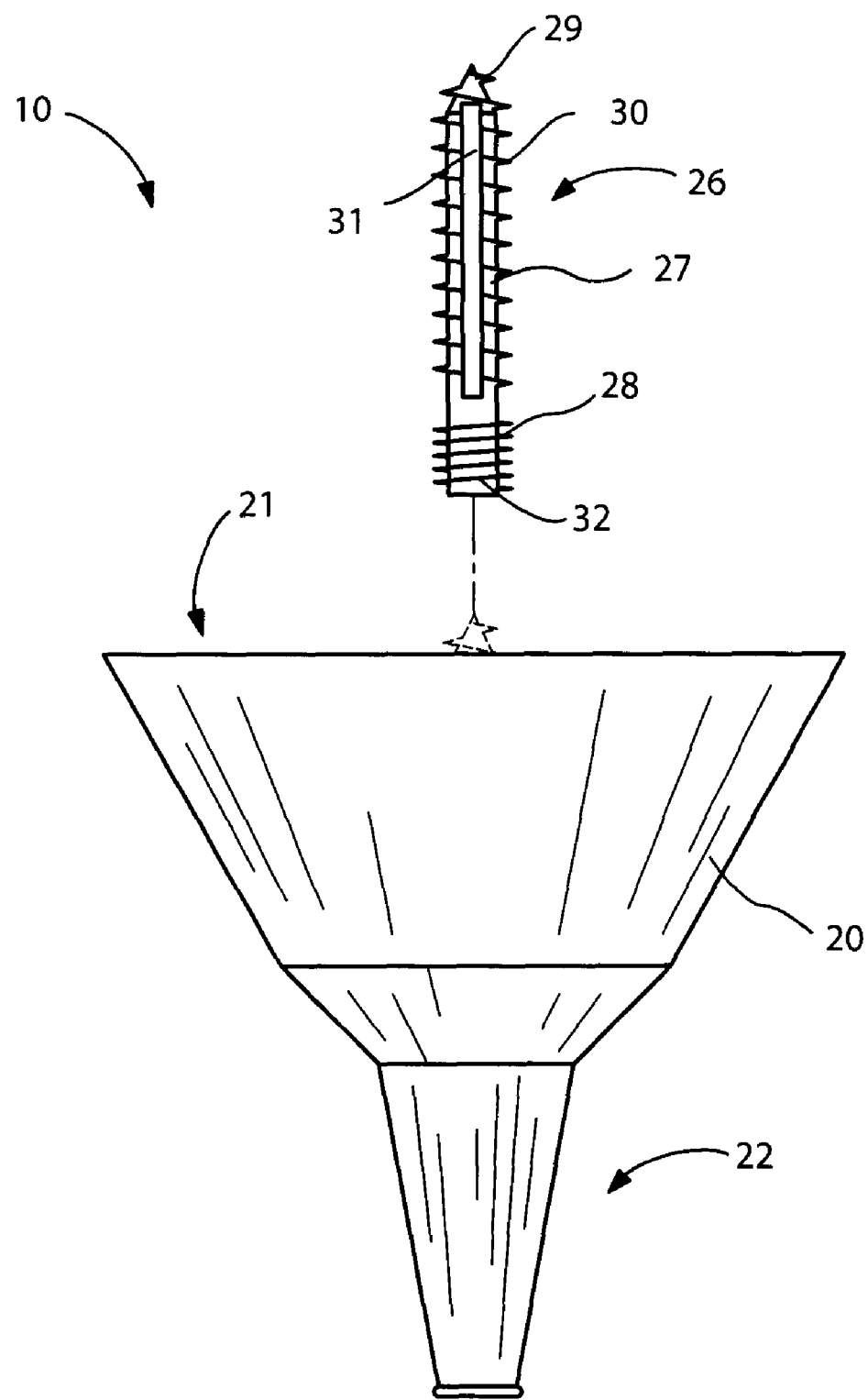
FIG. 5 is a front elevational view of the funnel and puncturing implement, showing the removability of the implement, in accordance with the present invention.

Referring to FIG. 3, the apparatus 10 further includes a plurality of channels 25 formed within the support wall 23 and extending downwardly to the spout 22. Such a plurality of channels 25 is laterally spaced away from a second threaded outer section of the shaft. The channels 25 are provided for allowing the oil to flow from the existing oil filter 11 and through the spout 22.

Referring to FIGS. 1, 2, 3, 4 and 5, the apparatus 10 further includes a rigid puncturing implement 26 removably attached to the funnel 20 and centrally aligned within the top end 21. Such a puncturing implement 26 is anchored to the support wall 23 and extends vertically up from the support wall 23 and terminates at an axially opposed position from the spout 22. The puncturing implement 26 includes an elongated and rectilinear shaft 27 with a first threaded outer section 28 extending downwardly from a proximal end 29 of the shaft 27 and terminating above the support wall 23. Such a shaft 27 further has a second threaded outer section 30 juxtaposed subjacent to the first threaded outer section 28 and is removably inserted into the support wall 23. The shaft 27 is pushed upward to puncture an existing oil filter 11 to thereby release the oil into the funnel 20.

The shaft 27 is provided with a pair of rectilinear grooves 31 traveling along a major longitudinal length of the first threaded outer section 28. Such grooves 31 are diametrically offset along opposed sides of the first threaded outer section 28 which is important such that residual oil contained within the existing oil filter 11 is guided downwardly along separate paths and into the spout 22. The shaft 27 has a distal end 32 disposed above a top most edge of the spout 22, and the grooves 31 extend inwardly towards a center of the shaft 27 and along the second threaded outer section 30. The grooves 31 prevent the shaft 27 from impeding the flow of the oil through the funnel.

The puncturing implement 26 is penetrable into one end of the existing filters 11 and thereby causes oil to drain out therefrom while the existing filter 11 is attached to the existing engine which is vital such that residual oil trapped within the existing filter 11 is substantially drained before the existing filter 11 is removed from the engine.

In use, the drain tool for oil filters and the like is simple and straightforward to use. Such an apparatus is used after the oil has been drained from the oil pan and before the filter is removed. The threaded shaft effectively penetrates the oil filter casing and is screwed inward until the funnel is abutted against the casing. A hose is directly connected, without the use of intervening elements, to the dispensing spout of the funnel. Such a hose is positioned in a container in which the oil in the filter is to be drained, which is crucial for capturing the oil being removed from the oil filter. After the oil contained in the filter is effectively drained, the oil filter is then removed without any risk of oil leaking onto the area beneath the filter.

The apparatus includes a small funnel with a pointed shaft conveniently extending outward from the center of the funnel. Such a shaft is pointed on the end and affords threads positioned on the shaft, just behind the pointed end, which is essential for attaching to the oil filter during operating conditions. Of course, such a shaft can be produced from a variety of suitable materials, as is obvious to a person of ordinary skill in the art. The lower end of the funnel tapers inward to form a narrow neck terminated by a lipped dispensing spout to which an accompanying hose would be directly connected, without the use of intervening elements.

The present invention, as claimed, provides the unexpected and unpredictable benefit of an apparatus that is convenient and easy to use and lightweight yet durable in design. Such an apparatus is affordable and effective and makes it possible to change oil filters in a much cleaner way which does not cause ecological damage. The present invention is a much needed benefit which would minimize clean up work after an oil change and safeguard the environment.

In use, a method for draining oil from an existing filter includes the steps of: providing a bifurcated funnel 20 with a first region defining an open top end 21 and further with a second region defining a tapered spout 22 terminating at a bottom most edge of the funnel 20 respectively; removably attaching a rigid puncturing implement 26 to the funnel 20 by centrally aligning the puncturing implement 26 within the top end 21; anchoring the puncturing 26 implement to the funnel 20 and extending the puncturing implement 26 vertically up from generally the spout 22 and terminating the puncturing implement 26 at an axially opposed position from the spout 22; while the existing filter 11 is attached to the existing engine, penetrating the puncturing implement 26 into one end of the existing filter 11 and thereby causing oil to drain out therefrom such that residual oil trapped within the existing filter 11 is substantially drained; and removing the existing filter 11 from the engine.

In use, the method further includes the steps of: providing an elongated and rectilinear shaft 27 with a first threaded outer section 28 extending downwardly from a proximal end 29 of the shaft 27 and terminating above the second region; removably inserting a second threaded outer section 30 of the shaft 27 that is juxtaposed subjacent to the first threaded outer section 28 of the shaft 27 into the support wall 23; and downwardly guiding residual oil from the existing oil filter 11 along separate paths and into the spout 22.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An oil filter draining apparatus for discharging oil contained within an existing filter before the existing filter is removed from an existing engine, said oil filter draining apparatus comprising:

a funnel having an open top end and a tapered spout terminating at a bottom most edge of said funnel, said funnel having a support wall formed substantially medially of said funnel and at a top entrance of said spout such that said top end and said spout are in fluid communication;

a plurality of channels formed within said support wall and extending downwardly to said spout; and a puncturing implement removably attached to said funnel and centrally aligned within said top end, said puncturing implement being anchored to said support wall and extending vertically up from said support wall and terminating at an axially opposed position from said spout;
wherein said puncturing implement is penetrable into one end of the existing filter and thereby causes oil to drain out therefrom while the existing filter is attached to the existing engine such that residual oil trapped within the existing filter is substantially drained before the existing filter is removed from the engine;
wherein said puncturing implement comprises
an elongated and rectilinear shaft having a first threaded outer section terminating above said support wall, said shaft further having a second threaded outer section juxtaposed subjacent to said first threaded outer section and being removably inserted into said support wall, said shaft being provided with a pair of rectilinear grooves traveling along a major longitudinal length of said first threaded outer section, said grooves being diametrically offset along opposed sides of said first threaded outer section such that residual oil contained within the existing oil filter is guided downwardly along separate paths and into said spout.

2. The oil filter draining apparatus of claim 1, wherein said support wall comprises: a plurality of coextensively shaped ribs flanging radially away from a center thereof, said ribs being monolithically formed with an interior surface of said funnel and disposed above said spout.

3. The oil filter draining apparatus of claim 1, wherein said plurality of channels are laterally spaced away from said second threaded outer section of said shaft.

4. The oil filter draining apparatus of claim 1, wherein said shaft has a distal end disposed above a top most edge of said spout.

5. The oil filter draining apparatus of claim 1, wherein said grooves extend inwardly towards a center of said shaft and along said second threaded outer section.

6. An oil filter draining apparatus for discharging oil contained within an existing filter before the existing filter is removed from an existing engine, said oil filter draining apparatus comprising:
a funnel having a first region defining an open top end and further having a second region defining a tapered spout terminating at a bottom most edge of said funnel respectively, said funnel having a support wall formed substantially medially of said funnel and at a top entrance of said spout such that said top end and said spout are in fluid communication, said top end converging downwardly towards said spout;
a plurality of channels formed within said support wall and extending downwardly to said spout; and
a rigid puncturing implement removably attached to said funnel and centrally aligned within said top end, said puncturing implement being anchored to said support wall and extending vertically up from said support wall and terminating at an axially opposed position from said spout;
wherein said puncturing implement is penetrable into one end of the existing filter and thereby causes oil to drain out therefrom while the existing filter is attached to the existing engine such that residual oil trapped within the existing filter is substantially drained before the existing filter is removed from the engine;
wherein said puncturing implement comprises an elongated and rectilinear shaft having a first threaded outer section terminating above said support wall, said shaft further having a second threaded outer section juxtaposed subjacent to said first threaded outer section and being removably inserted into said support wall, said shaft being provided with a pair of rectilinear grooves traveling along a major longitudinal length of said first threaded outer section, said grooves being diametrically offset along opposed sides of said first threaded outer section such that residual oil contained within the existing oil filter is guided downwardly along separate paths and into said spout.

7. The oil filter draining apparatus of claim 6, wherein said support wall comprises: a plurality of coextensively shaped ribs flanging radially away from a center thereof, said ribs being monolithically formed with an interior surface of said funnel and disposed above said spout.

8. The oil filter draining apparatus of claim 7, wherein said plurality of channels are laterally spaced away from said second threaded outer section of said shaft.

9. The oil filter draining apparatus of claim 6, wherein said shaft has a distal end disposed above a top most edge of said spout.

10. The oil filter draining apparatus of claim 7, wherein said grooves extend inwardly towards a center of said shaft and along said second threaded outer section.

11. A method for draining oil from an existing filter, said method comprising the steps of:
a. providing a funnel having a first region defining an open top end and further having a second region defining a tapered spout terminating at a bottom most edge of said funnel respectively; and
b. removably attaching a rigid puncturing implement to said funnel by centrally aligning said puncturing implement within said top end;
c. anchoring said puncturing implement to said funnel and extending said puncturing implement vertically up from generally said spout and terminating said puncturing implement at an axially opposed position from said spout;
d. while the existing filter is attached to the existing engine, penetrating said puncturing implement into one end of the existing filter and thereby causing oil to drain out therefrom such that residual oil trapped within the existing filter is substantially drained; and
e. removing the existing filter from the engine;
wherein step b, further comprises the steps of:
providing an elongated and rectilinear shaft having a first threaded outer section terminating above said second region;
removably inserting a second threaded outer section of said shaft that is juxtaposed subjacent to said first threaded outer section of said shaft into said support wall; and
downwardly guiding residual oil from the existing oil filter along separate paths and into said spout.

* * * * *